United States Patent [19]

Slesinski et al.

[11] Patent Number: 5,342,255
[45] Date of Patent: Aug. 30, 1994

[54] LOCKING MECHANISM FOR DRIVING AXLE DIFFERENTIAL

[75] Inventors: Steven G. Slesinski, Kalamazoo; Bruce A. Muselin, Battle Creek, both of Mich.

[73] Assignee: Eaton Corporation, Cleveland, Ohio

[21] Appl. No.: 976,626

[22] Filed: Nov. 16, 1992

[51] Int. Cl.⁵ .............................................. F16H 1/44
[52] U.S. Cl. ................................. 475/231; 475/230; 475/240; 475/241
[58] Field of Search ............... 475/231, 233, 230, 237, 475/241, 240

[56] References Cited

U.S. PATENT DOCUMENTS

| | | | |
|---|---|---|---|
| 3,105,394 | 10/1963 | Salzmann | 475/237 OR |
| 4,555,962 | 12/1985 | Bucarelli | 475/237 X |
| 4,703,671 | 11/1987 | Jikihara | 475/237 X |
| 4,805,486 | 2/1989 | Hagiwara et al. | 475/241 X |
| 4,873,892 | 10/1989 | Ohkubo | 475/237 OR |

*Primary Examiner*—Leslie A. Braun
*Assistant Examiner*—Daniel Wittels
*Attorney, Agent, or Firm*—Roger A. Johnston

[57] ABSTRACT

A drive axle differential has the shift fork for the differential locking curvic clutch collar slidably received over a push-rod and registered against a flange on the push-rod. The push-rod has one end slidably received in a bore in the differential carrier and the other end threadedly engaging an air pressure power piston. A slot is provided in the threaded end of the push-rod for an adjustment tool and a locking screw is threaded against the push-rod after adjustment. The piston cover containing the air pressure control signal port then attached to the differential carrier.

5 Claims, 2 Drawing Sheets

1

LOCKING MECHANISM FOR DRIVING AXLE DIFFERENTIAL

BACKGROUND OF THE INVENTION

The present invention relates to power dividing differential devices employed in vehicle driving axles, and particularly heavy-duty driving axles of the type employed in tandem arrangement. In providing drive axles for heavy-duty trucks and off the road vehicles, it is desirable to provide a means of locking the differential mechanism in the driving axle for providing added traction in situations where the primary concern is maximum traction rather than differential wheel motion to accommodate turning.

Heretofore, differential locking in a driving axle has been accomplished by a collar or sleeve splined to either half axle for axial sliding movement on the half axle to cause engagement of a curvic clutch provided between the sliding collar and the differential carrier. The collar or sleeve is engaged by a shift fork or lever which is movable by an air pressure operated piston mechanism provided on the axle carrier. A known technique for interconnecting the piston and the shift fork has employed a plunger slidably mounted in the axle carrier which is positioned on the shift fork by a clamp tightened with a set screw accessible through the carrier by removal of an access plug. This arrangement has proven to be troublesome in service in that the set screw loosens, and the adjustment of the shift mechanism is lost. Furthermore, it has been found to be difficult to tighten the set screw through the access hole in the housing when the shift lever is moved fully to the clutch engaged position. It has also proven difficult to properly adjust the shifting mechanism through the access hole during axle assembly.

Thus, it has been desired to find a way or means of providing for convenient adjustment of the air pressure-actuated shifting means for effecting locking and unlocking of the differential action in drive axles of the type employed for heavy-duty service and, in particular, drive axles are of the type employed in tandem arrangement.

DETAILED DESCRIPTION

Figure 1:
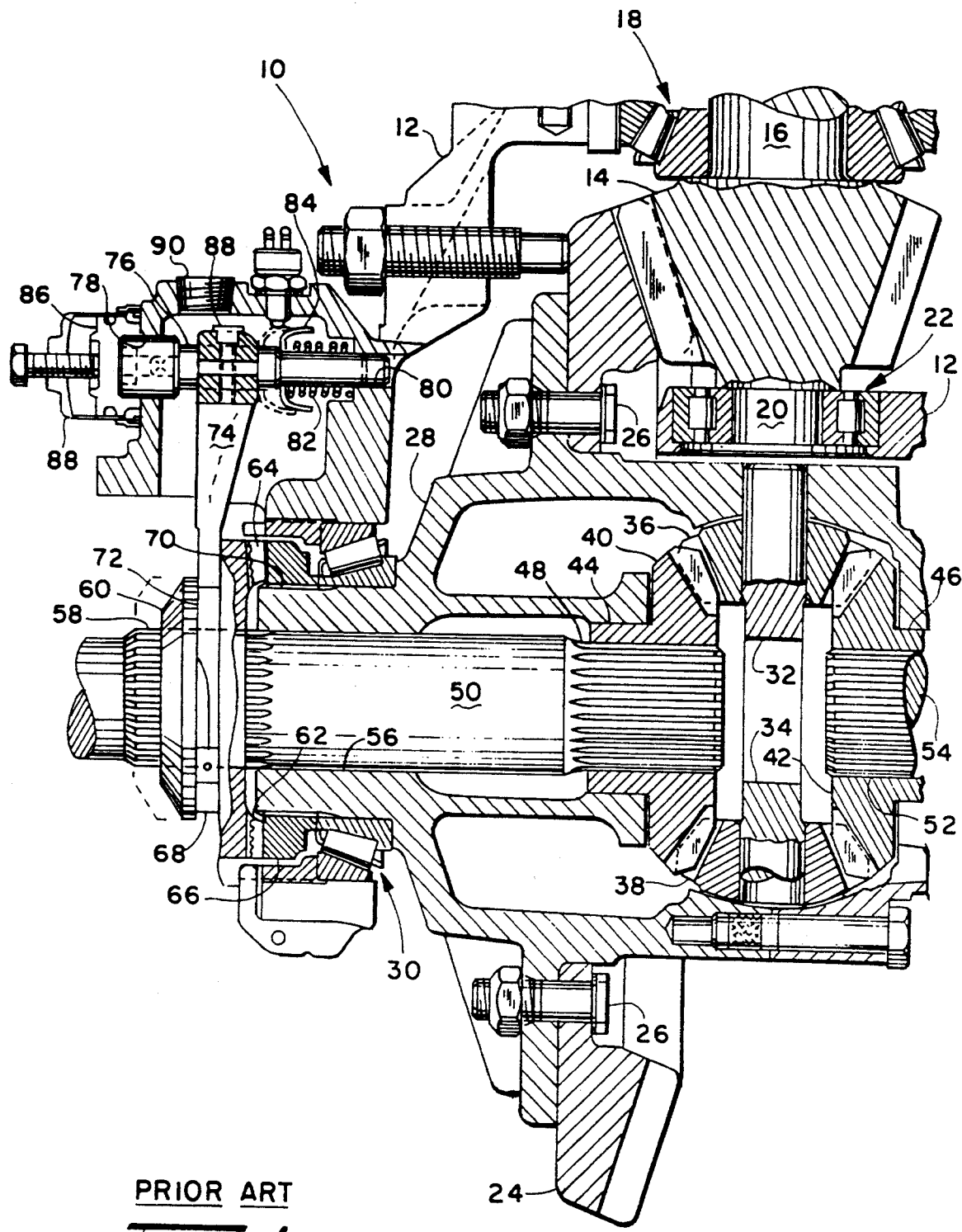
FIG. 1 is a cross-section of a typical driving axle for a heavy-duty vehicle and illustrates the prior art techniques of effecting locking of the differential mechanism.

Referring to FIG. 1, a driving axle assembly is indicated generally at 10, and has a casing or carrier 12 with a power input pinion 14 having a pinion shaft 16 attached thereto, typically integrally, and journalled in a bearing assembly indicated generally at 18. Pinion 14 has a stub shaft 20 on the opposite side thereof from shaft 16; and, the stub shaft is journalled in a bearing assembly indicated generally at 22 mounted on casing 12. Drive pinion 14 engages ring gear 24, which is attached by bolts 26 to differential case 28, which is journalled on opposite sides thereof by a pair of bearings, one of which is illustrated in FIG. 1 and denoted generally by reference numeral 30. Differential case 28 has a pair of oppositely disposed pins 32, 34 mounted therein generally at right angles to the direction of rotation of the case in bearing 30; and, the pins 32, 34 each have, respectively, a differential side pinion 36, 38 mounted thereon for free rotation thereabout. The differential side pinions 36, 38 are engaged on opposite sides thereof by a pair of side gears 40, 42 which have hubs provided thereon denoted, respectively, by reference numerals 44, 46 which are journalled for rotation in differential case 28.

Side gear hub 44 has received therein and engaged therewith in driving engagement the inboard splined end 48 of half axle shaft 50; and, similarly, side gear hub 46 has received therein and engaged therewith the inboard end, which is splined as denoted by reference numeral 52 of an oppositely directed half axle shaft 54.

Half axle shaft 50 is journalled for rotation on surface 56 of the differential case on the outboard end of the differential case 28.

The outboard end of half axle shaft 50 has provided thereon a second spline 58 which has received thereover in splined driving engagement therewith and axially slidable thereon a sliding clutch 60. A plurality of curvic teeth 62 is provided on the inboard axial face of sliding clutch 60, which teeth 62 are engageable with correspondingly shaped teeth 64 provided about the outer axial face of a fixed clutch 66, which is splined over the end of the differential case 28, as denoted by reference numeral 70; thus, fixed clutch 66 is in driving engagement with axle shaft 50.

Groove 68 in sliding clutch 60 is engaged by forked end 72 of a shift fork 74. The upper end of shift fork 74 has a clamp formed therein, which is received over a push-rod 76. It will be understood that the shift fork 74 and sliding clutch 60 are illustrated in FIG. 1 in the rightward-most position such that the sliding clutch 60 has the curvic teeth 64 thereof in driving engagement with the curvic teeth 62 on fixed clutch 66. In the clutch-engaged position illustrated, relative rotation between differential case 28 and half axle shaft 50 is prevented.

It will be understood that when shift fork 74 and sliding clutch 60 are moved leftward to the position shown in dashed outline in FIG. 1, the clutch sliding clutch 60 is disengaged from the teeth on fixed clutch 66 and relative rotation of the half axle shaft 50 with respect to the differential case 28 is thus permitted.

In the prior art mechanism shown in FIG. 1, push-rod 76 is slidably engaged with differential carrier 12 in bore 78 at its left end, and in differential carrier bore 80 at its right end, and is biased in the leftward direction by spring 82 acting against a spring cap 84 registered against a shoulder provided on the push-rod. The left end of push-rod 76 is in operative contact with a piston 86, which is responsive to an air pressure signal through a air pressure line (not shown) connected to a cover 88 provided over the piston.

The shift fork 74 has the end thereof clamped over the push-rod 76, and tightened thereon by set screw 88, which is accessible only through a hole in the differential carrier upon removal of the threaded plug 90.

Figure 2:
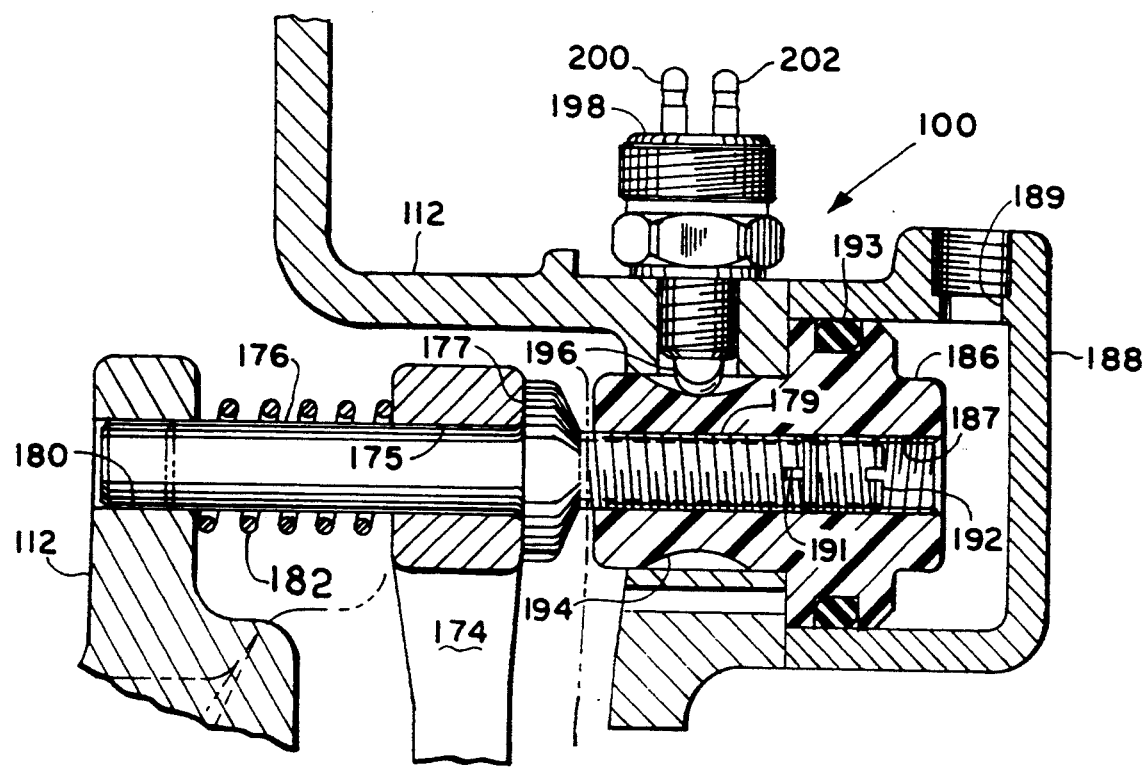
FIG. 2 is an enlarged view of a portion of FIG. 1 which illustrates the invention technique of adjusting the differential locking mechanism.

Referring to FIG. 2, the present invention denoted generally by reference numeral 100 is illustrated as embodied in an axle assembly of the type illustrated in FIG. 1, wherein the shift fork 174 has an aperture 175 provided therein, with push-rod 176 received therethrough, and with an enlarged-diameter flanged portion 177 provided thereon and registered against the face of the shift fork 174. One end of the push-rod 176 is slidably received in a bore 180 provided in the differential carrier 112. Spring 182 urges shift fork 174 in a rightward direction against the flange portion 177. The right hand end of push-rod 176 has threads 179 provided thereon, which threadedly engage a central threaded bore 187 provided in piston 186. The piston 186 is slidable in, and sealed with respect to the inner periphery of a cover 188 by seal ring 193. An air pressure port 189 is provided therein for receiving an air pressure control signal.

The position of the registration shoulder 177 for shift lever 174 is thus adjustable with respect to the piston 186 by inserting a tool, such as a screwdriver, into the threaded bore 187 and engaging a slot 191 provided in the end of the push-rod 176 and rotating the push-rod with respect to the piston 186. Preferably, a locking screw 192 is threadedly engaged in the threads 187 and tightened against the end of the push-rod to secure the adjusted position thereof.

Preferably, a detent surface 194 is provided in the piston, which is engaged by plunger 196 of a position-indicating switch 198 for providing an electrical signal through terminals 200, 202 upon axial movement of the piston.

The present invention thus provides for ease of adjustment of the position of the shift fork 174, adjustment of the threaded end of push-rod 176 with piston 186 in place, with cover 188 removed. The adjusted position is then secured by the set screw 192; and, cover 188 is then attached by any suitable expedient as, for example, screws received through mounting flange (not shown) to attach the cover 188 to the differential carrier 112. A suitable air pressure signal line may then be attached to the port 189.

Although the invention has hereinabove been described with respect to the illustrated embodiment, it will be understood that the invention is capable of modification and variation, and is limited only by the scope of the following claims.

We claim:

1. An adjustable locking mechanism for a drive axle differential comprising:
   (a) an axle carrier having a drive pinion journalled thereon and a differential carrier driven by said pinion and having oppositely directed axle shaft journalled therein with each shaft having a side gear drivingly attached thereto and engaged by a pair of power dividing spider gears journalled on said case;
   (b) means defining curvic clutching surfaces on said carrier and rotatable therewith;
   (c) an annular clutching member drivingly disposed on one of said axle shafts and axially movable thereon for engaging and disengaging said curvic clutch surfaces;
   (d) an actuator member movably disposed with respect to said housing and operable, upon movement between a first and second position, to effect said engaging and disengaging of said clutching member;
   (e) pressure-responsive means operably connected to said actuator member for, in response to an air pressure signal, effecting movement of said actuator member;
   (f) means for adjusting the connection of said pressure-responsive means with said actuator member comprising a push-rod rotatably received through an aperture in said member and threadedly engaging said pressure-responsive means wherein said means for adjusting the connection extends through a housing, said housing encloses said adjustable locking mechanism and said means for adjusting is adjustable from outside of said housing.

2. The mechanism defined in claim 1, wherein said push-rod is also slidably received on said aperture and includes surfaces thereon for registration against said member and said means for adjusting spring biasing said push-rod surfaces in registration with said member.

3. The mechanism defined in claim 1, wherein said pressure-responsive means comprises a piston with said push-rod centrally threaded thereon.

4. The mechanism defined in claim 1, wherein said pressure-responsive means comprises a piston formed of steel material with said push-rod centrally threaded therein.

5. The mechanism defined in claim 1, wherein said pressure-responsive means comprises a piston with said push-rod centrally threaded therein and said means for adjusting including a locking screw threaded in said piston.

* * * * *